United States Patent
Caulk, Jr. et al.

(10) Patent No.: US 6,341,324 B1
(45) Date of Patent: Jan. 22, 2002

(54) EXCEPTION PROCESSING IN SUPERSCALAR MICROPROCESSOR

(75) Inventors: Robert L. Caulk, Jr., Livermore; Hidetaka Magoshi, San Jose; Kevin L. Daberkow, Fremont, all of CA (US)

(73) Assignee: LSI Logic Corporation, Milpitas, CA (US)

( * ) Notice: Subject to any disclaimer, the term of this patent is extended or adjusted under 35 U.S.C. 154(b) by 998 days.

(21) Appl. No.: 08/540,349

(22) Filed: Oct. 6, 1995

(51) Int. Cl.[7] .............................................. G06F 13/00
(52) U.S. Cl. ...................................................... 710/260
(58) Field of Search ................................ 395/591, 570, 395/580, 569, 734, 740

(56) References Cited

U.S. PATENT DOCUMENTS

| | | | | |
|---|---|---|---|---|
| 5,148,544 A | * | 9/1992 | Cutler | .......................... 395/725 |
| 5,193,189 A | * | 3/1993 | Flood et al. | ................. 395/650 |
| 5,295,265 A | * | 3/1994 | Ducateau et al. | ........... 395/650 |
| 5,530,804 A | * | 6/1996 | Edgington et al. | ...... 395/183.06 |

* cited by examiner

Primary Examiner—David Wiley

(57) ABSTRACT

A microprocessor system includes a core CPU for instruction execution and a coprocessor interconnected with said core CPU for system control and exception processing. The coprocessor includes a plurality of exception handling registers including an exception program counter having a restart location stored therein for use after an exception is serviced, a status register having operating mode identification and interrupt enabling bits, and a configuration and cache control register. Interrupt processing is compatible with a plurality of instruction sets with a particular instruction set being designated by setting at least one bit in the configuration and cache control register. Registers are provided to save the operating state of the CPU prior to interrupt enable, the operating state of the CPU being restored after exception processing is completed and user mode is reestablished.

16 Claims, 16 Drawing Sheets

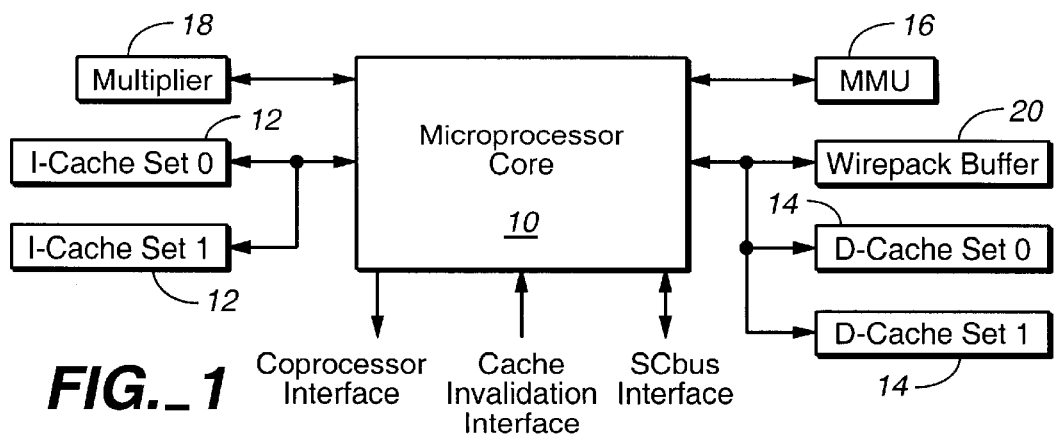
FIG._1
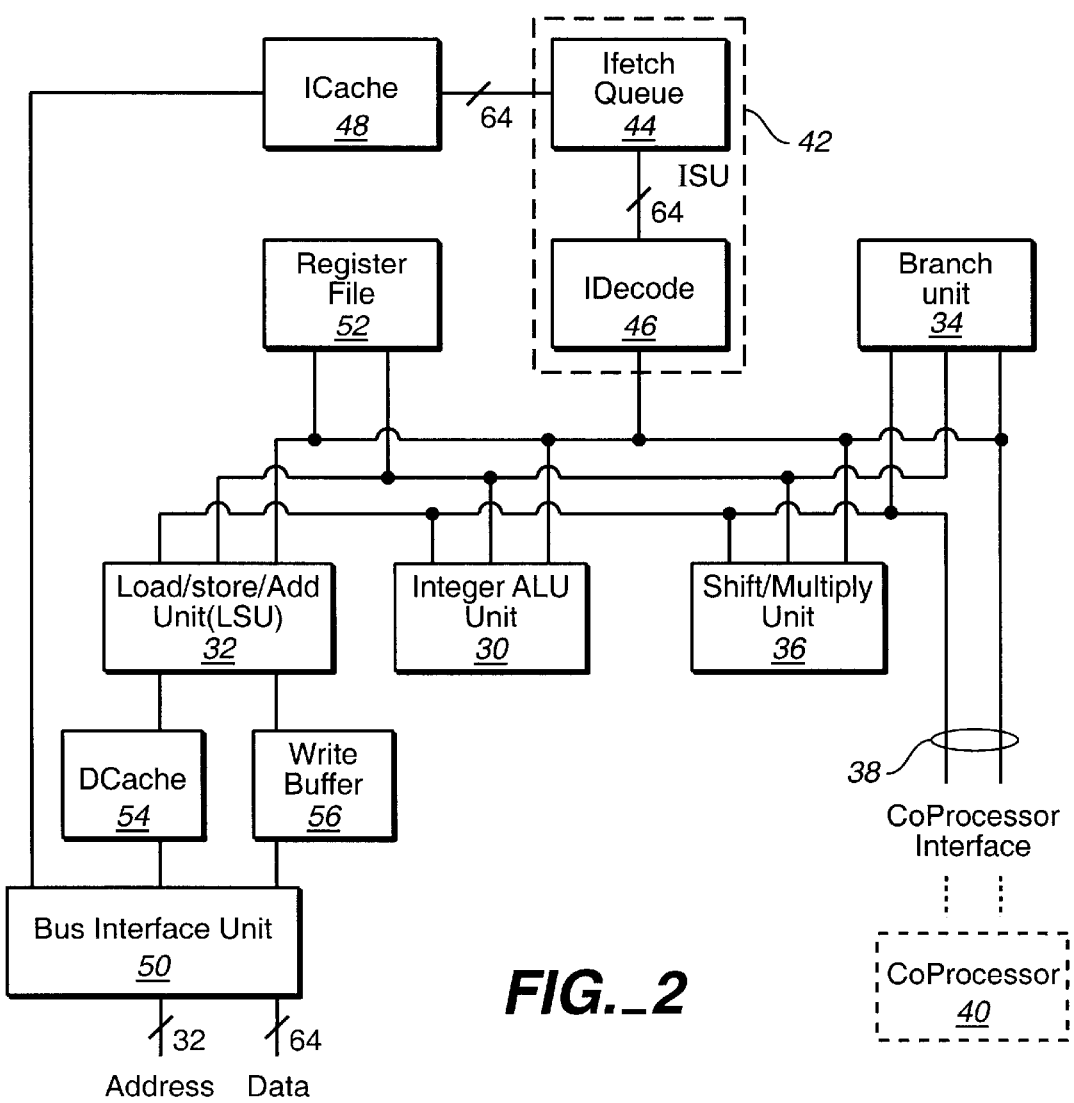
FIG._2

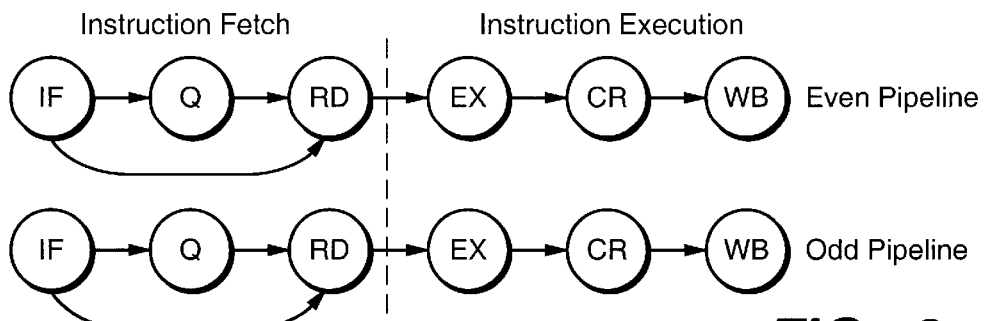
FIG._3
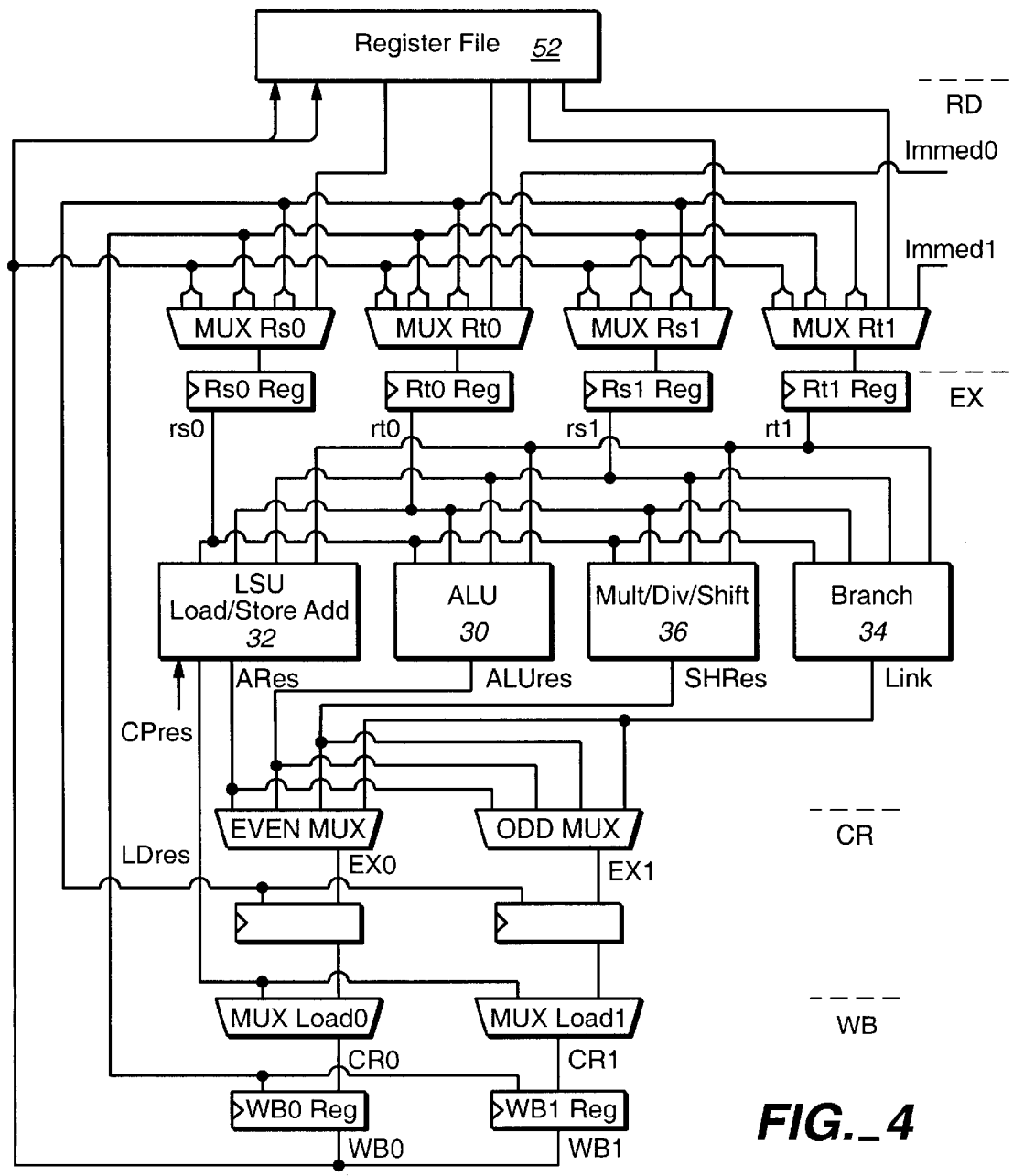
FIG._4

FIG._5
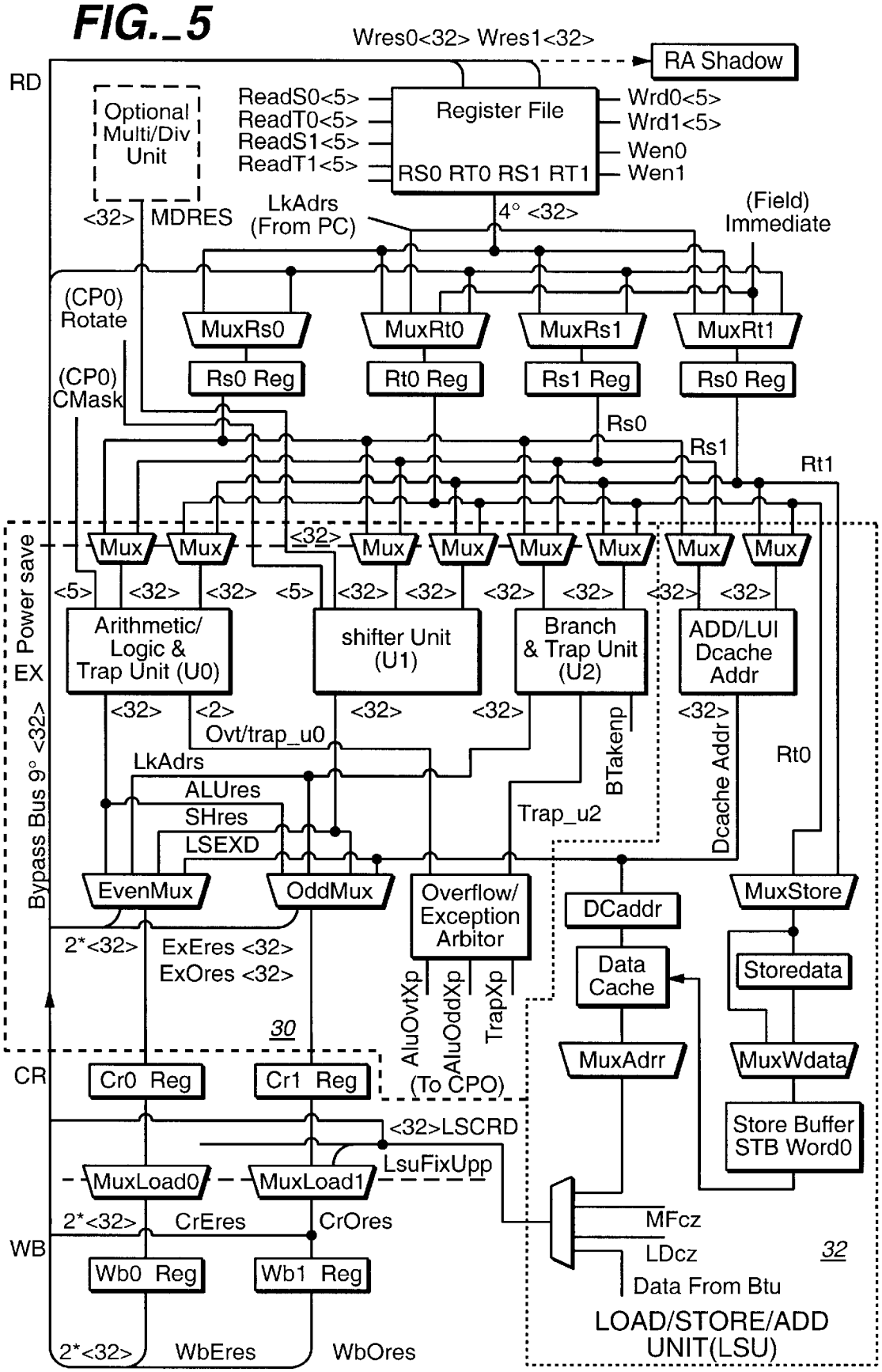

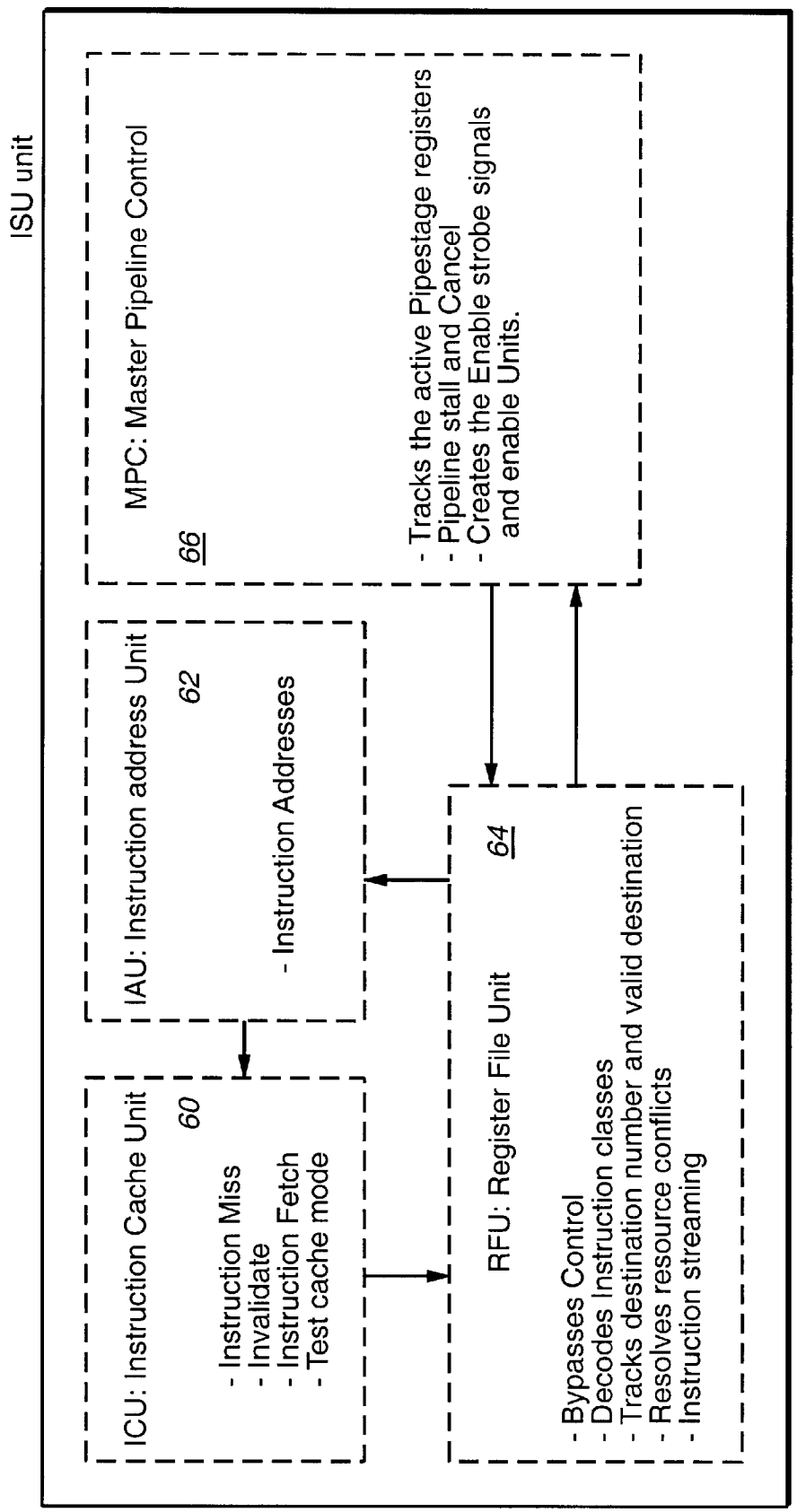
FIG._6

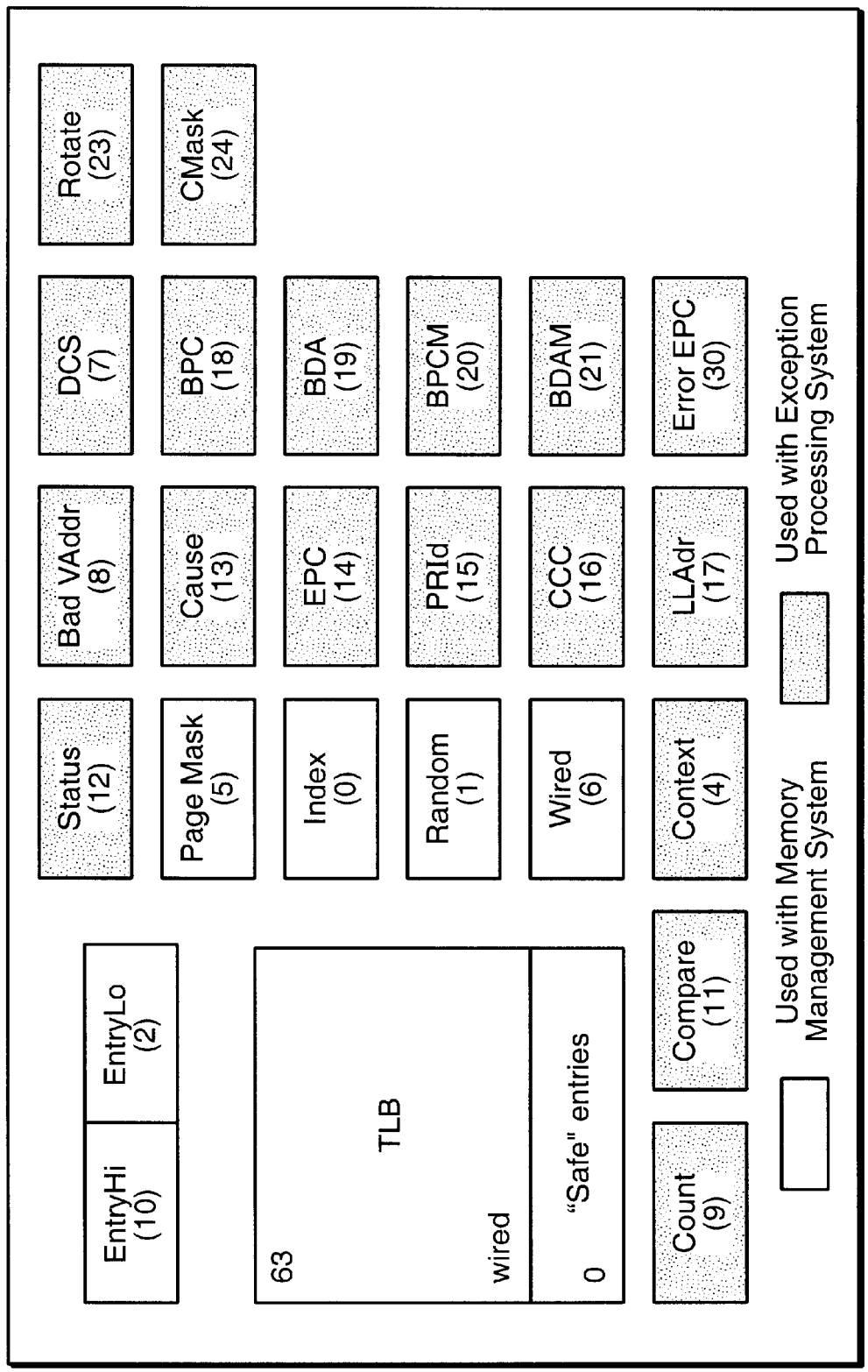
FIG._7

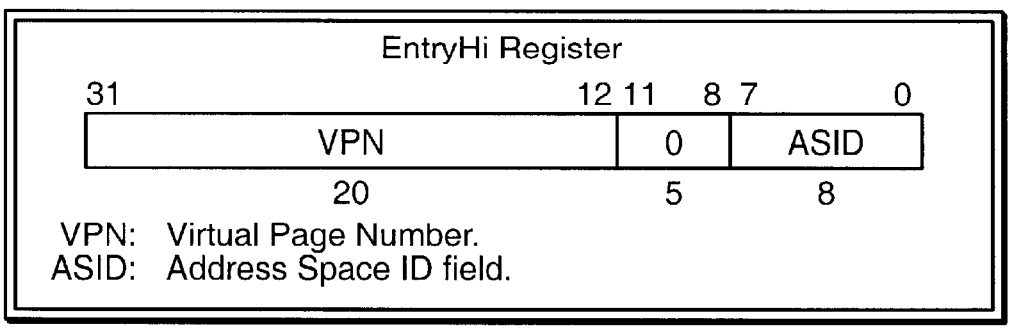
FIG._8
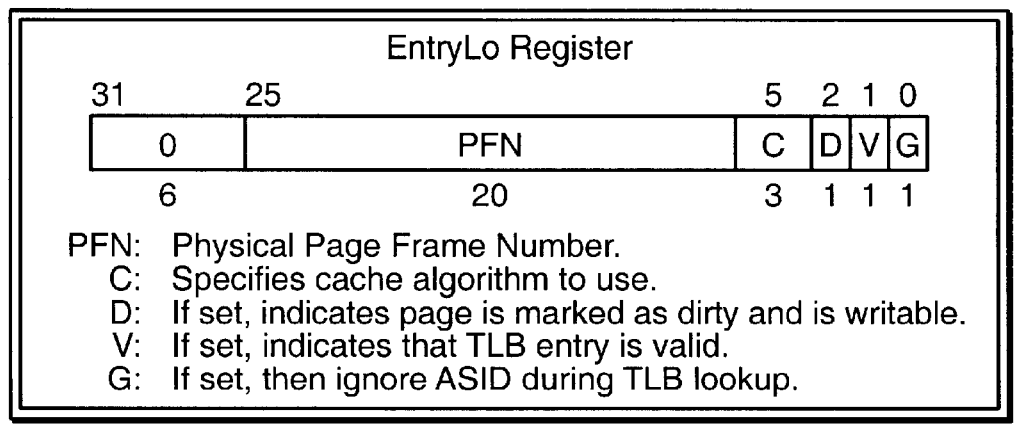
FIG._9
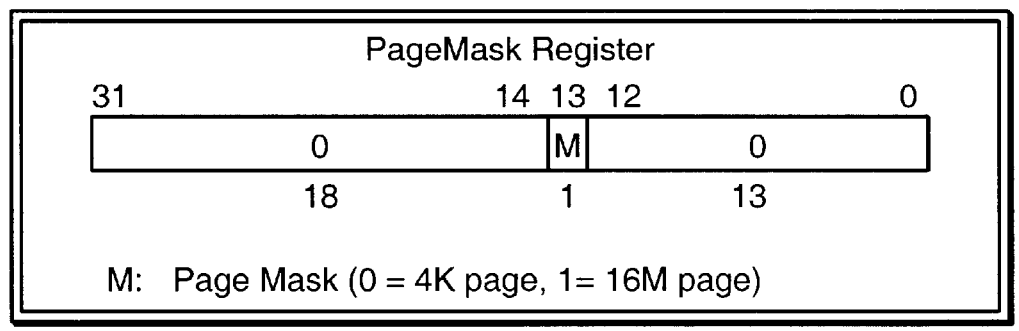
FIG._10

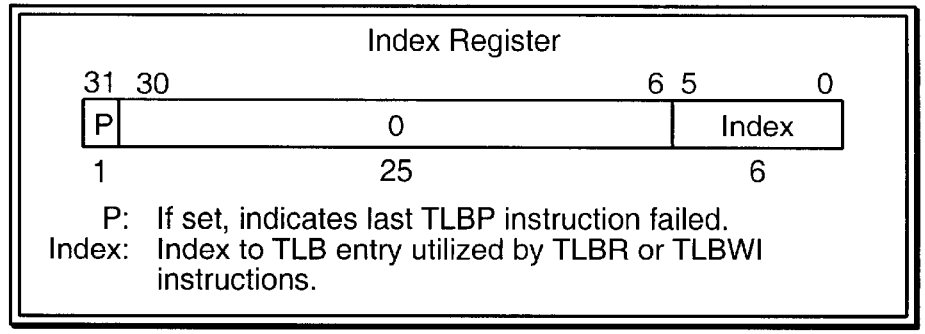
FIG._11
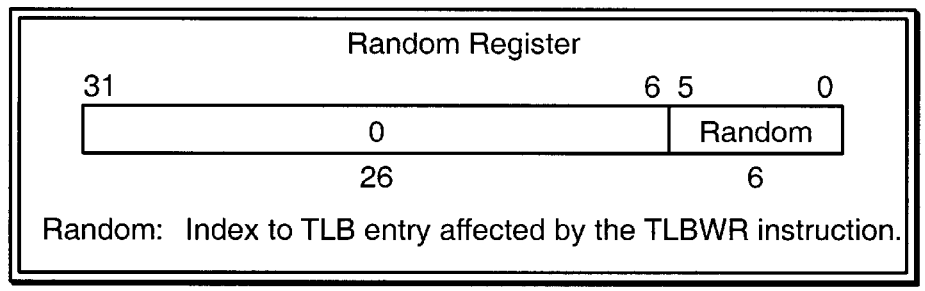
FIG._12
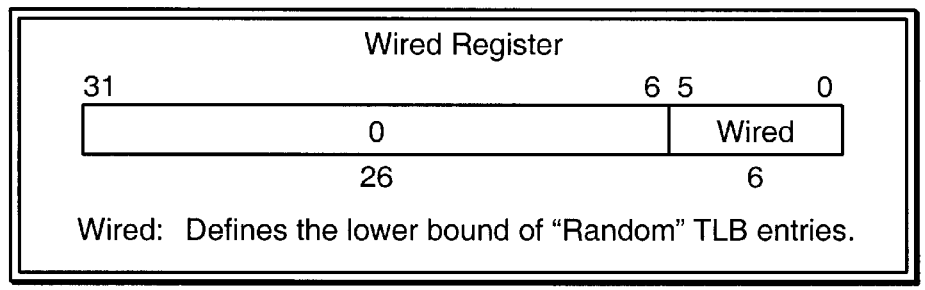
FIG._13
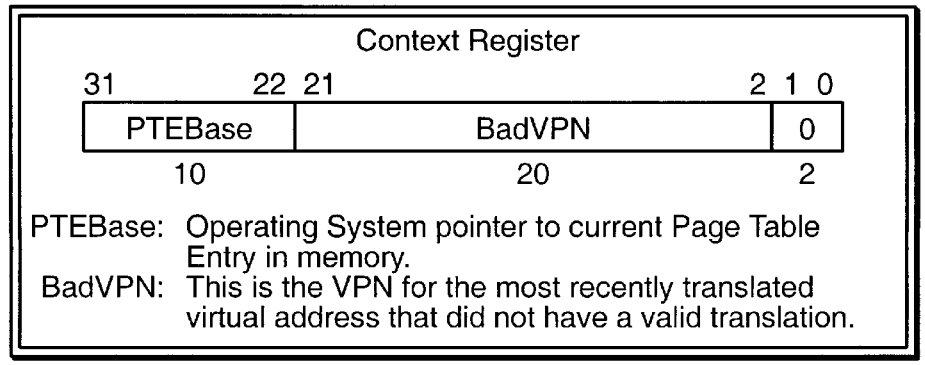
FIG._14

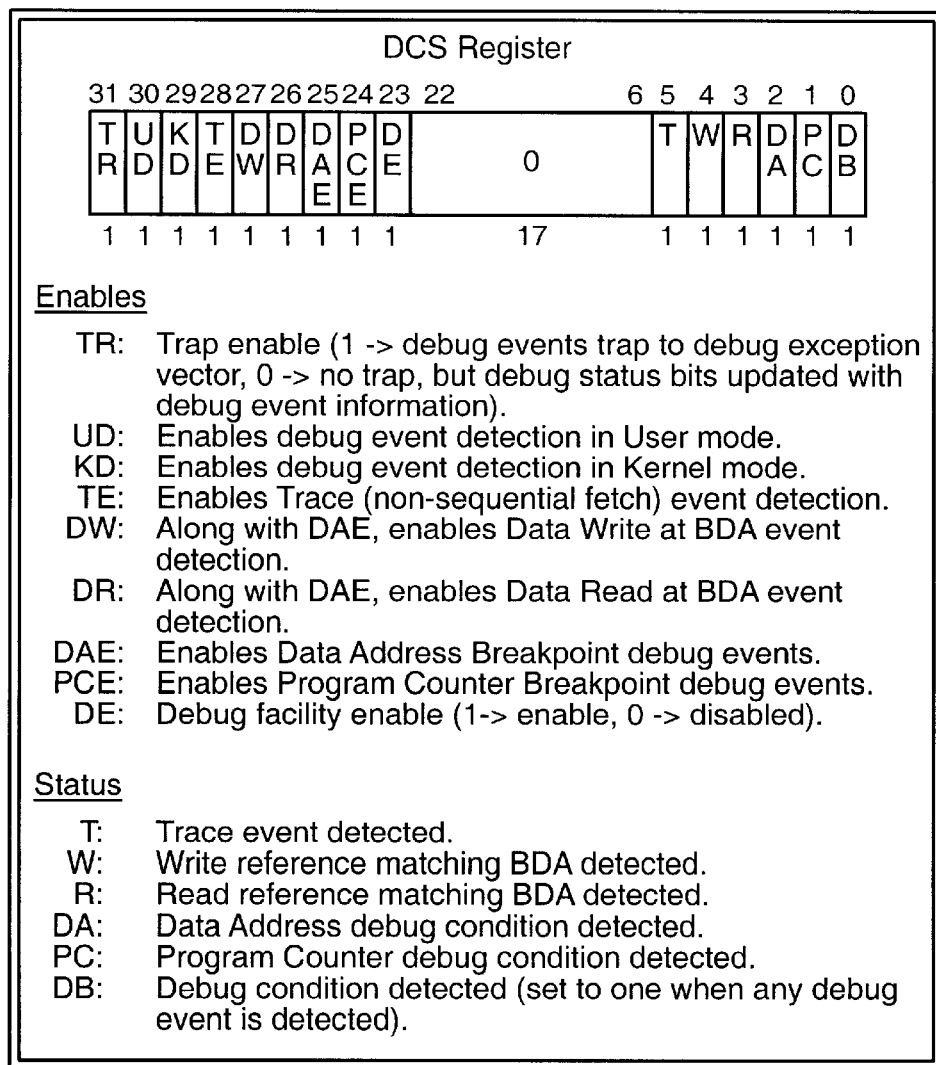
FIG._15
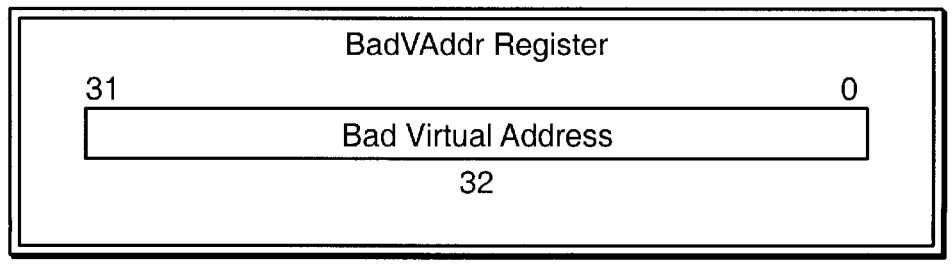
FIG._16

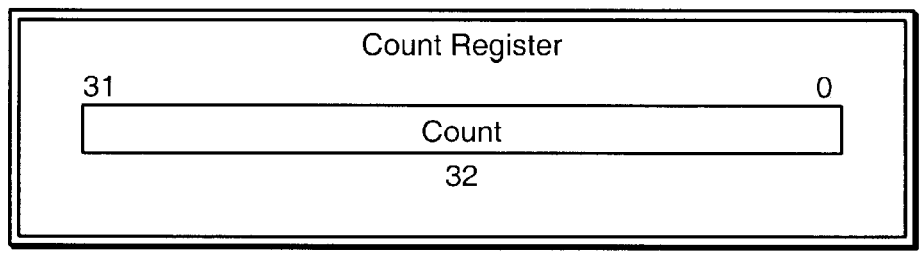
FIG._17
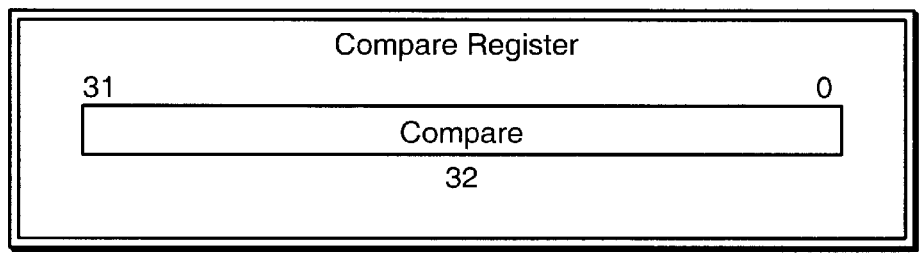
FIG._18
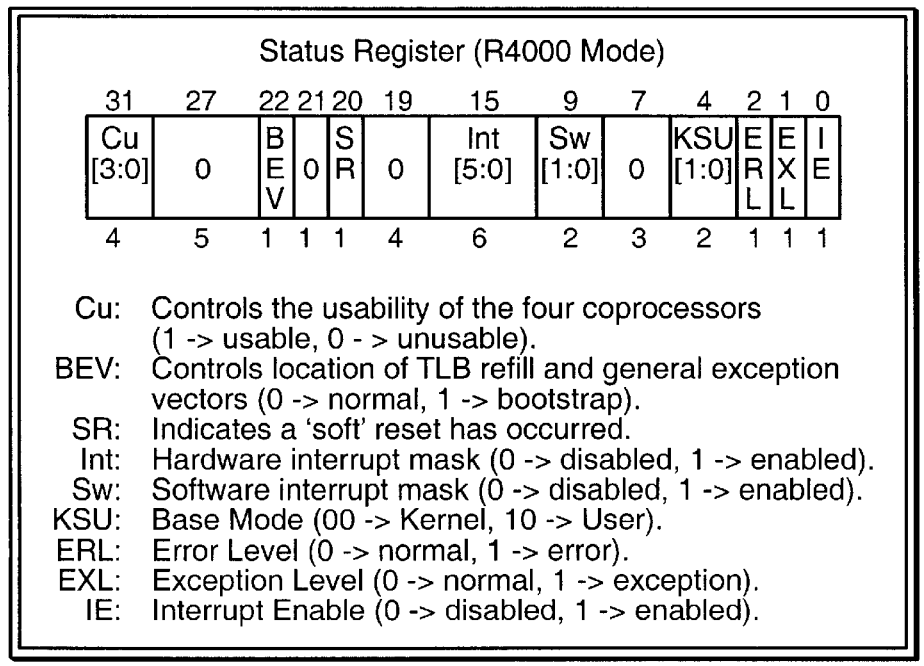
FIG._19

FIG._20

Status Register (R3000 Mode)

| 31 | 27 | 22 21 | 20 | 19 | 15 | 9 | 7 | 6 | 5 | 4 | 3 | 2 | 1 | 0 |
|---|---|---|---|---|---|---|---|---|---|---|---|---|---|---|
| Cu[3:0] | 0 | BEV | 0 | SR | 0 | Int[5:0] | Sw[1:0] | 0 | KUo | IEo | KUp | IEp | KUc | IEc |
| 4 | 5 | 1 | 1 | 1 | 4 | 6 | 2 | 2 | 1 | 1 | 1 | 1 | 1 | 1 |

Cu: Controls the usability of the four coprocessors (1 -> usable, 0 -> unusable).
BEV: Controls location of TLB refill and general exception vectors (0 -> normal, 1 -> bootstrap).
SR: Indicates a 'soft' reset has occurred.
Int: Hardware interrupt mask (0 -> disabled, 1 -> enabled).
Sw: Software interrupt mask (0 -> disabled, 1 -> enabled).
KUo: Kernel/User Mode "old" (0 -> Kernel, 1 -> User).
IEo: Interrupt Enable "old" (0 -> disabled, 1 -> enabled).
KUp: Kernel/User Mode "previous" (0-> Kernel, 1 -> User).
IEp: Interrupt Enabled "previous" (0 -> disabled, 1 -> enabled).
KUc: Kernel/User Mode "current" (0 -> Kernel, 1 -> User).
IEc: Interrupt Enabled "current" (0 -> disabled, 1 -> enabled).

FIG._21

Cause Register

| 31 | 30 | 29 | 27 | 15 | 8 | 7 | 6 | 2 | 0 |
|---|---|---|---|---|---|---|---|---|---|
| BD | BT | CE[1:0] | 0 | IP [7:0] | | 0 | ExcCode[4:0] | | 0 |
| 1 | 1 | 2 | 12 | 8 | | | 5 | | 2 |

BD: Indicates whether or not the last exception was taken while executing in a branch delay slot (1 -> delay slot, 0 -> normal).
BT: When the BD bit is set, this field indicates that the branch was taken.
CE: Indicates the coprocessor unit number referenced when a Coprocessor Unusable exception is taken.
IP: Indicates whether an interrupt is pending.
ExcCode: This is the exception code field (defined in Table 8 below).

FIG._22

EPC Register

| 31 | 2 | 1 | 0 |
|---|---|---|---|
| Exception Program Counter | | | 0 |
| 30 | | | 2 |

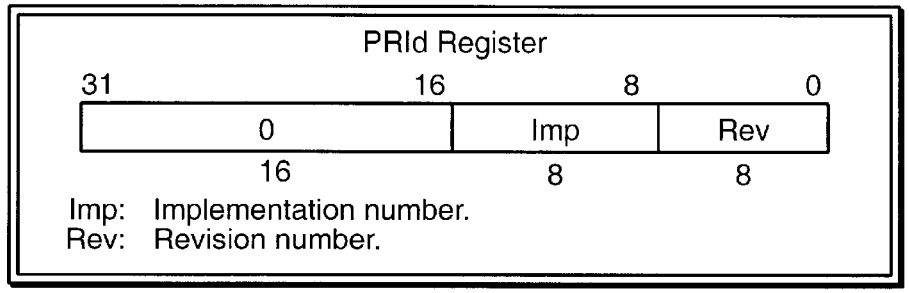
FIG._23
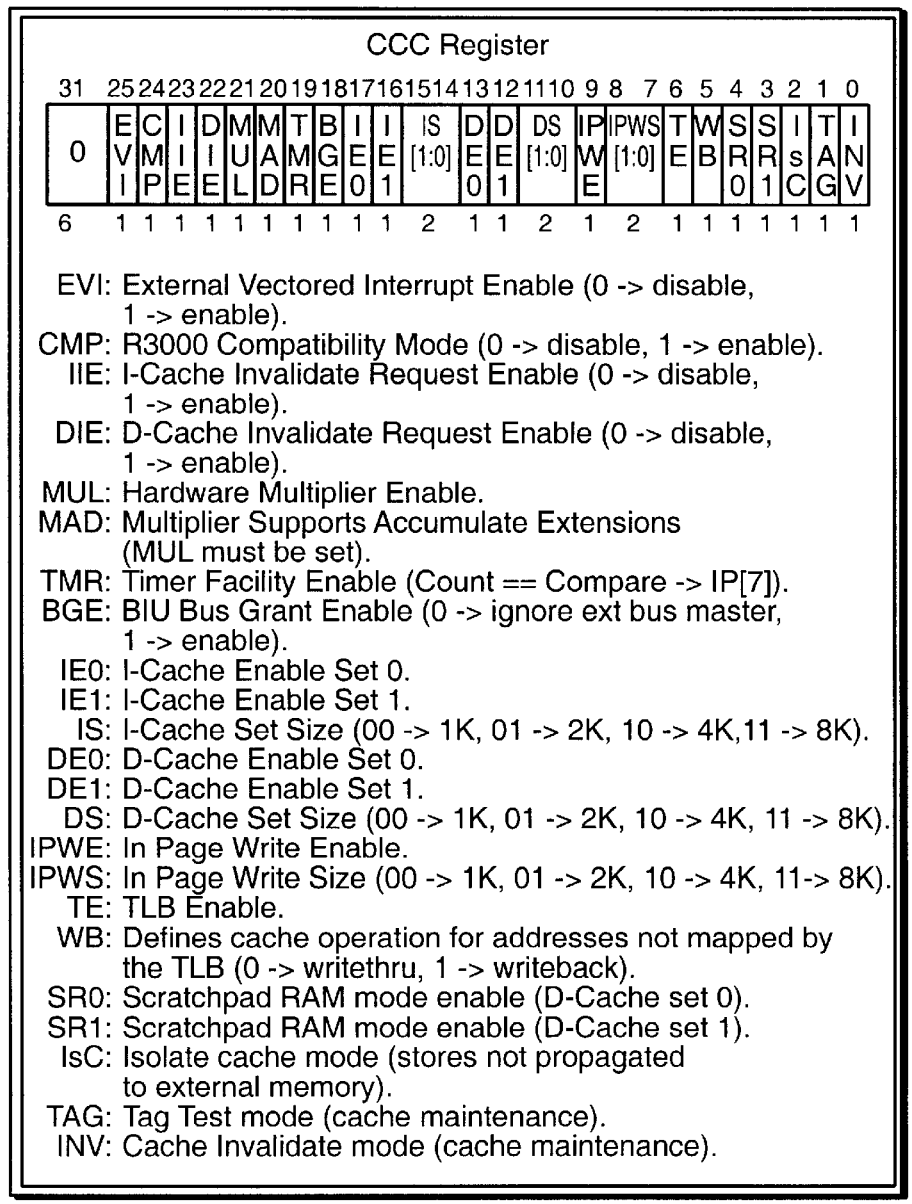
FIG._24

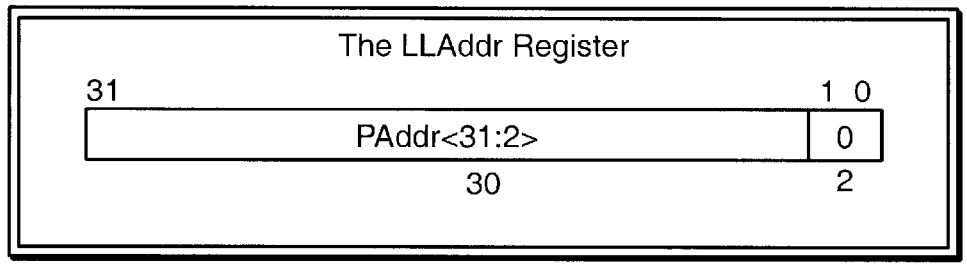
FIG._25
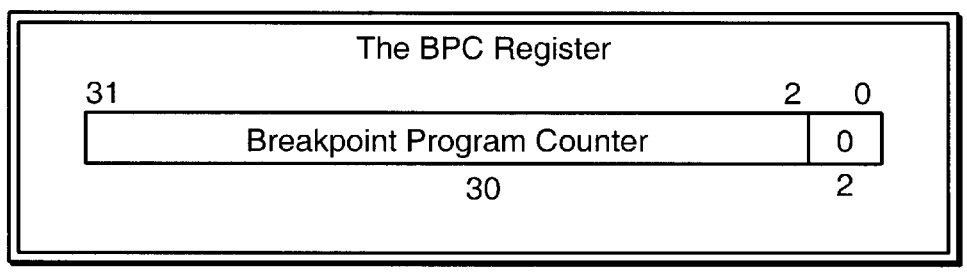
FIG._26
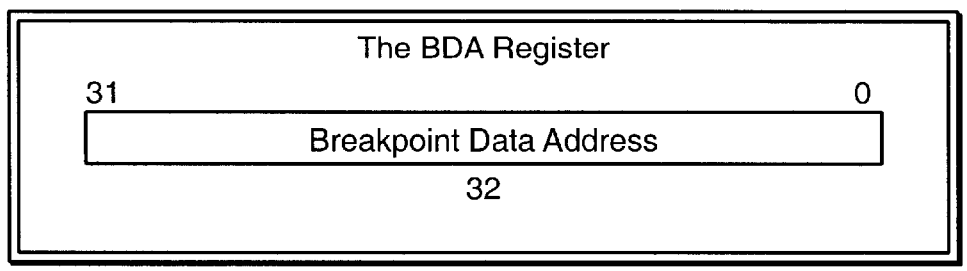
FIG._27
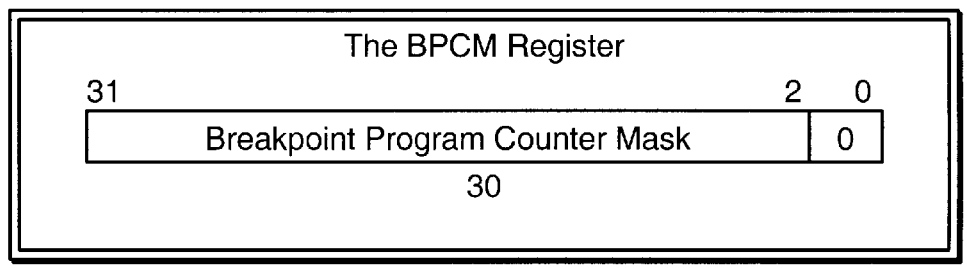
FIG._28

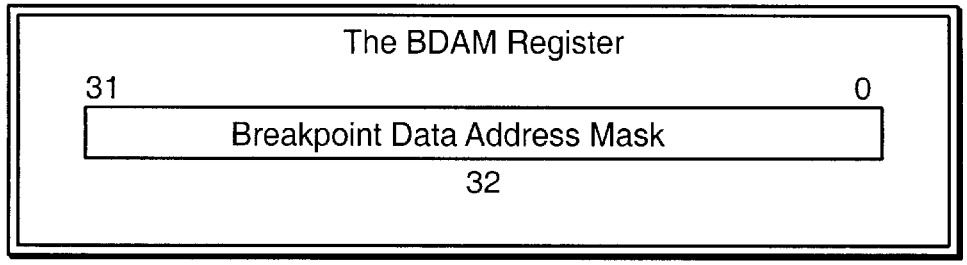
FIG._29
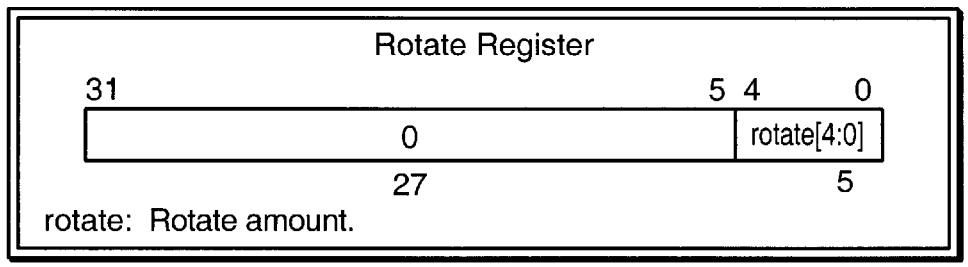
FIG._30
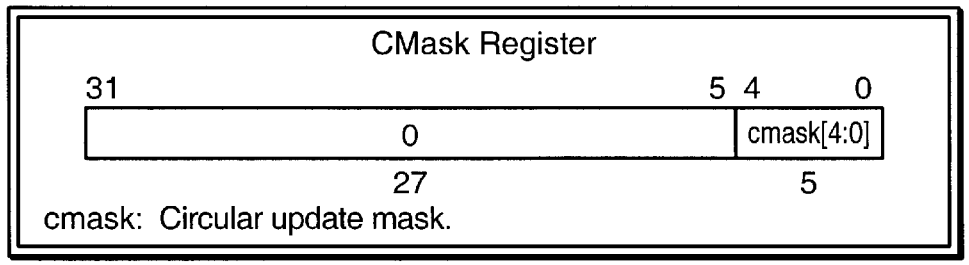
FIG._31
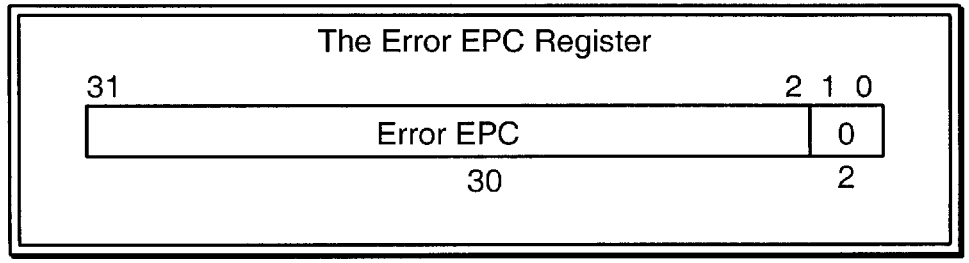
FIG._32

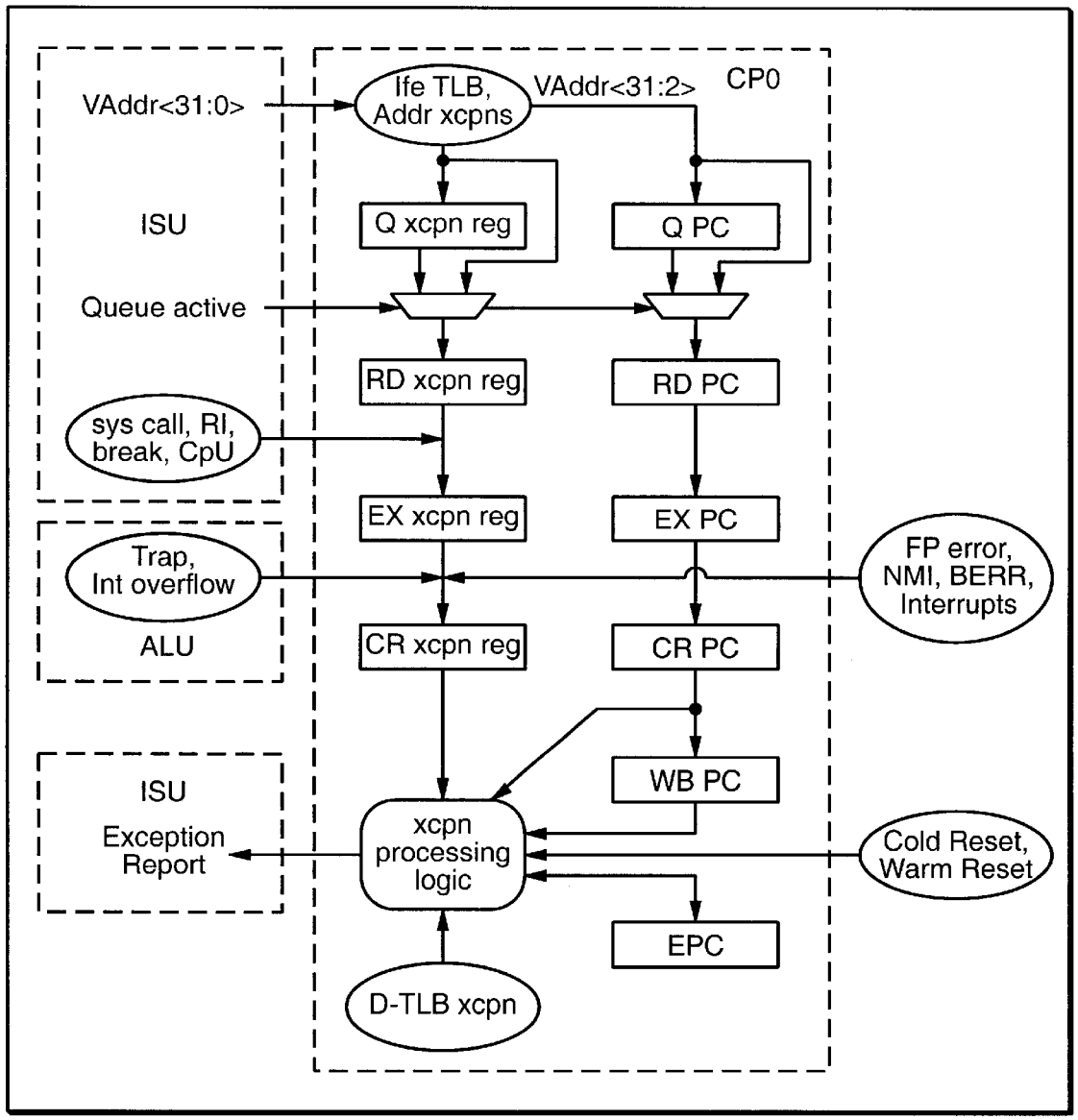
FIG._33

I-Type (Immediate)

| 31   26 | 25   21 | 20   16 | 15              0 |
|---------|---------|---------|-------------------|
| op      | rs      | rt      | immediate         |

J-Type (Jump)

| 31   26 | 25                                  0 |
|---------|---------------------------------------|
| op      | target                                |

R-Type (Register)

| 31   26 | 25   21 | 20   16 | 15   11 | 10   6 | 5      0 |
|---------|---------|---------|---------|--------|----------|
| op      | rs      | rt      | rd      | shamt  | funct    |

Notes:

| | |
|---|---|
| op | 6-bit operation code |
| rs | 5-bit source register specifier |
| rt | 5-bit target(source/destination register) |
| immediate | 16-bit immediate, branch displacement, or address displacement |
| target | 26-bit jump target address |
| rd | 5-bit destination register specifier |
| sharmt | 5-bit shift amount |
| funct | 6-bit function field |

FIG._34

| Access Type | Low-Order Address Bits: A1 A0 | Bytes Accessed Big-Endian 31 — 0 | Bytes Accessed Little-Endian 0 — 31 |
|---|---|---|---|
| Word | 0 0 | 0 1 2 3 | 3 2 1 0 |
| Tribyte | 0 0 | 0 1 2 | 2 1 0 |
| | 0 1 | 1 2 3 | 3 2 1 |
| Halfword | 0 0 | 0 1 | 1 0 |
| | 1 0 | 2 3 | 3 2 |
| Byte | 0 0 | 0 | 0 |
| | 0 1 | 1 | 1 |
| | 1 0 | 2 | 2 |
| | 1 1 | 3 | 3 |

FIG._35

EXCEPTION PROCESSING IN SUPERSCALAR MICROPROCESSOR

BACKGROUND OF THE INVENTION

This invention relates generally to computer systems, and more particularly the invention relates to exception handling in a system using a coprocessor.

The conventional RISC such as the MIPS R3000 and R4000 are pipelined processors operating with a limited or reduced instruction set. The instruction pipeline includes instruction fetch (IF), read (RD), ALU or execute (EX), memory (MEM), and write back (WB). The processor includes a CPU and a system control co-processor for memory management and cache control. The CPU includes a general register file, an ALU, a shifter, a multiplier/divider, an address Addr, and a program counter. The MIPS R3000 and R4000 have compatible instruction sets except for the handling of exceptions.

The RISC microprocessor offers distinct advantages in reduced hardware complexity and thus reduced design time and required area in a VLSI chip implementation, a uniform and streamlined handling of instructions, and increase in computing speed. A disadvantage resulting from the limited instruction set is the need for a plurality of instructions in executing some functions. Further, many RISC systems have large CPU register files to support RISC program execution and instruction traffic.

The present invention is directed to an enhanced RISC microprocessor system which is compatible with both the R3000 and R4000 instruction sets in handling exceptions.

SUMMARY OF THE INVENTION

In accordance with the invention, a microprocessor CPU has an architecture which includes a combination of five independent execution units: ALU, load/store/add unit (LSU), which executes loads and stores as well as add and load immediate instructions, a branch unit, a multiply/shift unit, and a co-processor interface for interfacing with a plurality of co-processor units. A co-processor zero unit (CPO) is the system control processor that supports address translation, exception handling, and other privileged operations. Other customer-defined co-processor units can be added.

Exception processing is handled by the system control coprocessor (CPO) which has a plurality of registers that are used in exception processing. When an exception occurs, CPO loads an exception program counter (EPC) with a restart location where execution may resume after the exception has been serviced. The restart location is the address of the instruction that caused the exception or, if the instruction was executing in a branch delay slot, the address of the branch instruction immediately preceding the delay slot. The instruction causing the exception along with all those following in the pipeline are aborted. The CPO exception registers are examined during exception processing to determine the cause of an exception and the state of the CPU at the time of the exception. A Status register is a modification of the register of the R4000 architecture for upward compatibility of software written for processors based on the R3000 architecture.

The invention and objects and features thereof will be more readily apparent from the following detailed description and dependent claims when taken with the drawings.

BRIEF DESCRIPTION OF THE DRAWINGS

FIG. 1 is an illustration of the microprocessor core with building blocks.

FIG. 2 is a functional block diagram of the CPU core.

FIG. 3 illustrates the dual pipeline of the CPU.

FIGS. 4 and 5 are schematics of the data path of the CPU.

FIG. 6 illustrates functions of the Instruction Scheduling Unit.

FIG. 7 illustrates coprocessor registers and Translation Lookaside Buffer.

FIGS. 8–32 illustrate specific coprocessor register content.

FIG. 33 illustrates the CPO exception pipeline.

FIG. 34 illustrates instruction formats.

FIG. 35 illustrates byte specifications for loads/stores.

DETAILED DESCRIPTION OF PREFERRED EMBODIMENT

FIG. 1 shows the superscalar microprocessor core along with building blocks which interface with the core as discussed in copending application Ser. No. 08/540,336 filed Oct. 6, 1995, now U.S. Pat. No. 5,603,047 issued Feb. 11, 1997, incorporated herein by reference. The core is also referred to herein as Cobra. The microprocessor has been implemented using the LSI Logic Core Ware system on a chip methodology whereby the core can be integrated into a system on a chip of various configurations. In the illustrated embodiment CPU core 10 is interconnected with a direct mapped or two-way set associative instruction cache 12, direct mapped or two-way associative data cache 14, a memory management unit 16 with 64 entry translation lookaside buffer, a standard multiply unit 18 or a high performance multiply/accumulate unit, and a Write Back buffer 20 for Write Back cache mode. The cache sizes are selectable up to 16k bytes. The options allow a user to develop a self-defined microprocessor. The core has an interface 21 to a coprocessor, and interface 22 to a cache invalidation unit, and an interface 23 to SC bus.

As will be described, the microprocessor core comprises an updated architecture to provide higher absolute performance than any other available MIPS solution and is fully compatible with the R3000 and R4000 32-bit instruction sets (MIPS-I and MIPS-II) in exception processing.

FIG. 2 is a functional block diagram of the microprocessor core. The machine can issue and retire two instructions per cycle using a combination of five independent execution units: ALU 30, load/store/add unit (LSU) 32 which executes, loads and stores and can also execute, add and load immediate instructions, branch unit 34, multiply/shift unit 36 and coprocessor interface 38 with a coprocessor 40. The instruction scheduling unit (ISU) 42 includes Ifetch queue (Q) unit 44 and Idecode unit 46. An instruction cache 48 is connected between a bus interface unit 50 and queue stage 44. The bus interface unit 50 manages the flow of instructions and data between the core and the system via the SC bus interface. A register file 52 contains the general purpose registers of the core. It supplies source operands to the execution units and handles the storage of results to target registers. A data cache 54 and write buffer 56 are connected between bus interface unit 50 and LSU unit 32.

Ifetch queue 44 optimizes the supply of instructions to the microprocessor even across breaks in the sequential flow of execution (i.e., jumps and branches). Idecode unit 46 decodes instructions from the Ifetch queue, determines the actions required for the instruction execution, and manages the register file 52, LSU 32, ALU 30, and multiply unit 36 accordingly. Branch unit 34 is used when branch and jump instructions are recognized within the instruction stream.

LSU unit 32 manages loads in stores of data values. Loads come from either the Dcache 54 or the SC bus interface 50 in the event of a Dcache miss. Stores pass to the Dcache and SC bus interface through the write buffer 56. LSU unit 32 also performs a restricted set or arithmetic operations, including the addition of an immediate offset as required in address calculations. The integer ALU unit 30 calculates the result of an arithmetic or a logic operation, while the multiplier/shift unit 36 performs multiply and divide operations. Thus all three units perform logical, arithmetic, and data movement operations.

As will be described further below, coprocessor interface 38 allows the attachment of a tightly coupled, special purpose processing unit to enhance the micro-processor's general purpose computational power. Using this approach, high performance application specific hardware can be made directly accessible to a programmer at the instruction set level. In accordance with the invention, exceptions are handled by the coprocessor. A cache invalidation interface (FIG. 1) allows supporting hardware outside of the microprocessor core to maintain the coherency of onboard cache contents for systems that include multiple main bus masters.

FIG. 3 illustrates the dual pipeline architecture of the core. The two concurrent pipelines (even and odd) have six stages for each pipeline. The first three stages comprise the instruction fetch phase and the last three stages comprise the instruction execution phase. In general, the execution of a single instruction consists of the following stages:

1. IF (instruction fetch) fetches the instruction.

2. Q (queuing) provides a conditional stage in which instructions may enter if they deal with branches or register conflicts. An instruction that does not cause a branch or register conflict is fed directly to the RD stage.

3. RD (read) reads any required operands from the register file while the instruction is decoded.

4. EX (execute) executes all instructions. Conditional branches are resolved in this cycle. The address calculation for load and store instructions are performed in this stage.

5. CR (cache read) is used to read the cache for load and store instructions. Data returned to the register bypass logic at the end of this stage.

6. WB (write back) is a register file in which results are written.

Each stage, once it has accepted an instruction from the previous stage, can hold the instruction for reexecution in case of pipeline stalls.

This circuitry is able to fetch and issue two instructions per cycle to the execute stage. Instructions are fetched as double word aligned pairs: slot-0 and slot-1. In the instruction decode stage, there is a two-instruction window. When only slot-0 can be scheduled because slot-1 has a dependency, then the window slides down one instruction. Thus although instructions are always fetched as double word pairs, they are scheduled on single word boundaries. Primary emphasis is placed on execution of branch instructions with minimal penalty. This is the primary function of the queue stage. In general, the queue stage is filled whenever the RD stage has a stall. This can occur fairly often for register conflicts, cache misses, resource conflicts, and the like. Filling the queue stage in this case allows the IF stage to work ahead one cycle.

When a branch instruction is encountered and the queue stage is active, the branch is predicted to be taken and IF starts at the branch address. At this point, the queue stage holds the next non-branch instructions to evaluate. The branch target enters the RD stage, bypassing the queue stage. When the branch instruction enters the execute stage, the branch condition is resolved. If the branch was correctly predicted, then the instructions in the queue stage are cancelled. If the branch was incorrectly predicted, then the branch target is cancelled. In this case, the non-branch sequential instructions are taken from the queue stage, and the IF stage restarts at the non-branch sequential stream. In general, this means that a branch instruction which is correctly predicted from the even 1 slot and the queue stage is full, will have no cycle penalty associated with it. In the case where the branch is incorrectly predicted the branch has a one cycle penalty.

If the branch instruction is in the odd one slot, then the branch delay slot instruction will always execute by itself, with no chance to fill the other execution slot.

The branch prediction logic is capable of looking at two instructions at a time, from either the queue latches or the RD latches, depending on whether the queue stage is active. From the two instructions, if one is a branch, then the offset in that instruction is passed into a dedicated Addr to calculate the branch address for the IF stage instruction fetch. Since this is done speculatively, the non-branch value of the PC is also saved for the possible restart of the sequential instructions from the queue stage.

Once an instruction pair has been allowed to pass into the RD stage, it is decoded and at the same time the register source addresses are passed to the register file for reading operands. Register dependencies and resource dependencies are checked in this stage. If the instruction in slot-0 has no dependency on a register or resource currently tied up by previous instruction, then it will be passed immediately into the EX stage where it forks to the appropriate execution unit. The instruction in slot-1 may also be dependent on a resource or register in slot-0, so it must be checked for dependencies against both slot-0 and any previous not retired instruction. If either instruction must be held in the RD stage, then if the queue stage is not full, the IF stage will be allowed to continue in order to fill the queue stage. If the queue stage is full, then the queue and IF stages will be frozen or stalled. Register bypass opportunities are considered in the RD stage, and the bypass multiplexors control signals are set for potential bypass cases from a previous instruction which is still in the pipeline. For instruction execution, the pair of instructions or a single instruction when there was a previous block, are individually passed to the independent execution units. Each execution unit receives operands from the register bypass logic and an instruction from the instruction scheduler. Each instruction spins one run cycle in an execution unit. In the case of ALU and other single cycle instructions, the result is then fed to the register/bypass unit for the CR stage.

For load and store instructions, the cache lookup occurs during the CR stage. For loads, data is returned to the register/bypass unit during this stage. This includes loads to a coprocessor. For all other instructions these are holding stages which are used to hold the result of the execution stage for write back to the register file.

FIG. 4 is a schematic of the CPU data path with various stages of the pipeline labeled to visualize the instruction execution flow. The data path is organized around different blocks. All instructions are issued at the RD stage under the control of an instruction scheduling unit. The architecture of the data path balances the ability of executing a dual instruction per cycle and the underlying complexity essentially due to the execution units.

Most of the instructions execute in a single cycle at the EX stage except for the divide, multiply, and derivative instructions. For theses instructions, once their opcodes are decoded at the RD stage, these successive operations are controlled internally to the ALU and the ISU is informed that the associated unit is busy.

When a memory instruction is decoded, the LSU unit 32 assumes responsibility for the successive steps and resolves eventual resource complex detected at the EX stage and following stages of the pipeline. LSU unit 32 informs the ISU that its pipeline cannot get advanced due to a resource conflict. ISU takes the appropriate action by stalling the ALU pipeline and does not issue any new instructions.

LSU also informs ISU that both a data from a load instruction is missing and has been retrieved after an external transaction has taken place. ISU then inserts the retrieved data back into the appropriate write back register and at the same time forwards the retrieved data to the operand source register. However, when an arithmetic or a branch instruction is decoded, the ISU unit controls the instruction flow at all stages. Thus when a memory instruction is referenced and no resource conflicts prevent this instruction to be issued, the LSU receives from the ISU an enable execution signal active.

When one or two instructions need to execute within the ALU, their flow is controlled by a set of clock enabled signals coming from ISU. The register file includes four read ports and two write ports. It is part of the RFU unit and incorporates 32 general purpose CPU registers.

After instructions have been issued, their subsequent results can be forwarded to the source operand registers at each stage of the pipeline. A set of bypass multiplexors controlled by ISU will select either the register file read ports and/or the results coming from the different stages of the pipeline.

FIG. 5 is another illustration of the data path and further illustrating ALU 30 and LSU 32. ALU 30 is partitioned to allow independent execution of an ALU class instruction in parallel with a branch/trap instruction or other instructions. The multiply/divide type instructions are handled by an optional multiply/divide unit outside of the ALU but the results are forwarded to the ALU shifter unit (U1). The ALU, shift, and FFS/FFC instructions are all one cycle, combinatorial operations which are entirely controlled by the opcodes provided. The multiply, divide, MADD, and MSUB instructions are multi-cycle instructions. The control unit takes unit enable strobes and the pipeline stage control signals from the ISU and then passes them to associated units for decoding (NRD) and processing (NEX). It also handles the data path and pipe stage controls to direct EX stage results from four different execution units (U0/U1/U2/LSU Addr) to their proper destinations (even/odd/CR/WB stage or bypass). For ALU or link-type instructions, the outcomes of AL units (U0/U1/U2) and LSU Addr (if used) will be mixed at the end of EX stage and passed to their destination through CR/WB stage or bypass paths depending on their cases. Branch/trap instructions (no link to registers involved) will end at EX stage and the resulting signals (B taken/trap XP/ALUOVFXP/ALU odd XP) will go to ISU/CPO as soon as they are valid for their associated logic at the EX stage and do not involve the CR/WB stages. For memory-type instructions the result from LSU will pass to ALU at CR stage for advancing through the pipeline.

FIG. 6 defines the main tasks of the ISU. The ISU receives instruction pairs at the early instruction fetch stage, decodes the instructions at the RD stage, and eventually reorders the instructions and issues them at the EX stage. It decodes and forwards external coprocessor and CP0 instructions and centralizes the events that impact the pipeline.

The instruction cache unit (ICU) 60 is active for each instruction fetch cycle and informs the master pipeline control and register file units if an instruction is missing. It is the control part of the instruction cache.

The instruction address unit 62 provides the instruction cache addresses. Address sources are multiple and include sequential addresses, delay slot sequential addresses, a target address of a jump instruction, contents of the register from the register file, address bus from CP0 for an exception routine and return from exception, and an address coming from the queue address register in order to recover from an incorrect prediction.

The register file unit 64 handles both the queue and RD stages. It also determines whether or not instructions can be issued. The register file resolves in realtime the resource conflicts due either to a data dependency or to a structural conflict. Conjointly with the MPC it broadcasts both to the ALU, LSU and external coprocessors the appropriate control signals in order to regulate the ALU pipeline, CP0 and external coprocessors. When a memory instruction is decoded, it informs LSU unit that a load or a store instruction is to be issued.

The master pipeline control unit (MPC) 66 monitors the control signals coming from the RFU and provides the strobe signals to the IF, queue, and RD stage registers according to the resource conflicts coming from RFU and according to the state of the queue register (inactive or active). Externally, the MPU receives a general stall information from the LSU unit and takes the appropriate action by stalling all of the pipelines and informs the coprocessors to stop. From CP0 it also receives a valid exception signal and cancels the pipeline from the IF up to the TC stages. It broadcasts this cancel signal to both LSU and coprocessors to take the appropriate action. In normal mode operation, the MPU provides all the signals enabling the pipeline register clocks for the ALU pipeline. When both a coprocessor instruction is decoded by RFU and the corresponding coprocessor is not busy and is usable, the MPC provides the strobe signal to the related coprocessor. It also provides LSU with its enable signals whenever a memory instruction is decoded at RD stage.

EXCEPTIONS—Exceptions are handled by the coprocessor 0 (CP0). When the CPU detects an exception, the normal sequence of instruction execution is suspended; the processor exits user mode and enters a supervisory mode. The processor then disables, interrupts and forces execution of a software handler located at a fixed address and memory. The handler saves the context of the processor, this context must be restored when the exception has been handled.

CP0 is called the system control coprocessor and is implemented as an integral part of the microprocessor system. Besides exception handling, CP0 supports address translation and other privileged operations. It contains a 64 entry Translation Lookaside Buffer (TLB) plus 24 registers as shown in FIG. 7.

The following six registers are used with the memory management system and support the translation lookaside buffer;

EntryHi register—this register is a read/write register used to access the TLB. In addition, the register contains the current ASID value for the processor. This is used to match the virtual address with a TLB entry during virtual address translation. The register holds the high order bits of a TLB entry when performing TLB read and write operations. When either a TLB refill, TLB invalid, or TLB modified exception occurs, this register is loaded with the virtual page number (VPN) and the ASID of the virtual address that failed to have a matching TLB entry.

EntryLo (2) register—this register is a read/write register used to access the TLB. When performing read and write operations, it contains the physical page, frame number, cache algorithm, page dirty, translation valid and global entry information.

Pagemask register—this register is a read/write register used to access the TLB. It implements a variable page size by holding a per entry comparison mask. When virtual addresses are presented for translation, the corresponding pagemask bit in the TLB specifies whether or not virtual address bits participate in the comparison.

Index register—this register is a 32-bit read/write register containing six bits that are used to index an entry in the TLB. The Hi order bit indicates the success or failure of a TLB probe (TLBP) instruction. The index register also specifies the TLB entry that is affected by the TLB read (TLBR) and TLB write index (TLBWI) instructions.

Random register—this register is a read-only register of which six bits are used to index an entry in the TLB. The register decrements for each instruction executed. The values range between a lowerbound set by the number of TLB entries reserved for exclusive use by the operating system (defined in the wired register), and an upperbound set by the total number of TLB entries (64 maximum). The random register specifies the entry in the TLB affected by the TLB write random (TL-BWR) instruction. The register does not need to be read for this purpose; however, the register is readable to verify proper operation.

All other registers of CP0 are used with the exception processing system. When an exception occurs, CP0 loads the Exception Program Counter (EPC) with a restart location where execution may resume after the exception has been serviced. The restart location in the EPC is the address of the instruction that caused the exception or, if the instruction was executing in a branch delay slot, the address of the branch instruction immediately preceding the delay slot. The instruction causing the exception along with all those following in the pipeline are aborted.

Software examines the registers of the CP0 used with exception processing system to determine the cause of an exception and the state of the CPU at the time of the exception. Each of these registers is described as follows:

The Context register is a read/write register containing a pointer to an entry in the Page Table Entry (PTE) array. This array is an operating system data structure which stores virtual to physical address translations. When there is a TLB miss, operating system software handles the miss by loading the TLB with the missing translation from the PTE array. The BadVPN field is not writable. It contains the VPN of the most recently translated virtual address that did not have a valid translation (TLBL or TLBS). The PTEBase field is both writable as well as readable, and indicates the base address of the PTE table of the current user address space. The Contract register duplicates some of the information provided in the BadVAddr register, but the information is in a form that is more useful for a software TLB exception handler. The Context register can be used by the operating system to hold a pointer into the PTE array. The operating systems sets the PTE base field register, as needed. Normally, the operating system uses the Context register to address the current page map, which resides in the kernel-mapped segment kseg3. The register is included solely for use of the operating system. FIG. 14 shows the format of the Context register. The 20-bit BadVPN field contains bits 31:12 of the virtual address that caused the TLB miss. This format can be used directly as an address in a table of 4-byte PTEs for a page size of 4K bytes. For other PTE and page sizes, shifting and masking this value produces an appropriate address.

The Debug Control and Status (DCS) register contains the enable and status bits for the SCobra debug facility. All bits have read/write access. FIG. 15 shows the format of the DCS register.

The Bad Virtual Address register (BadV Addr) is a read-only register that holds the failing virtual address for address error (AdEL, AdES) and TLB translation (TLBL, TLBS, Mod) exceptions. FIG. 16 shows the format of the Context register.

The Count register acts as a timer, incrementing at a constant rate whether or not an instruction is executed, retried, or any forward progress is made. This register increments at half the maximum instruction issue rate. This is a read/write register; it can be written for diagnostic purposes or system initialization to synchronize two processors operating in lock step. FIG. 17 shows the format of the Count register.

The Compare register implements a timer service (see also the Count register) which maintains a stable value and does not change on its own. When the time facility is enabled and the value of the Count register equals the value of the Compare register, interrupt bit IP7 in the Cause register is set. This causes an interrupt to be taken on the next execution cycle in which the interrupt is enabled. Writing a value to the Compare register, as a side effect, clears the timer interrupt. For diagnostic purposes, the Compare register is read/write. In normal operation, the Compare register is only written. FIG. 18 shows the format of the Compare register.

The Status register is a read/write register that contains the operating mode, interrupt enabling, and the diagnostic states of the processor.

The format of the R4000 version of this register (CCC [24]=0) is shown in FIG. 19.

Interrupt Enable: Interrupts are enabled when all the following field conditions are true:

IE is set to 1.

EXL is cleared to 0.

ERL is cleared to 0.

If these conditions are met, interrupts are recognized according to the setting of the Int and Sw mask bits.

Processor Modes: SCobra processor mode definitions are as follows:

The processor is in User mode when KSU is equal to 10, and EXL and ERL are set to 0.

The processor is in Kernel mode when KSU is equal to 00, or EXL or ERL is set to 1.

Kernel Address Space Accesses: Access to the Kernel address space is allowed only when the processor is in Kernel mode.

KSU is equal to 00, or EXL is set to 1, ERL is set to 1.

User Address Space Accesses: Access to the User address space is always allowed.

Cold Reset: The contents of the Status register are undefined after a cold reset, except the following bits:

ERL and BEV are set to 1.

Warm Reset: The contents of the Status register are unchanged by warm reset, except the following bits:
ERL, BEV and SR bits are set to 1.
The format of R3000 version of this register (CCC[24]=1) is shown in FIG. 20.
Interrupt Enable: Interrupts are enabled when the following field condition is true:
IEc is set to 1.
If this condition is met, interrupts are recognized according to the setting of the Int and Sw mask bits.
The IEo/IEp/IEc bits comprise a 3-level stack showing the old/previous/current interrupt enable settings.
Processor Modes: SCobra processor mode definitions are as follows:
The processor is in User mode when KUc is equal to 1.
The processor is in Kernel mode when KUc is equal to 0.
The KUo/KUp/KUc bits comprise a 3-level stack showing the old/previous/current processor state settings.
Kernel Address space Accesses: Access to the Kernel address space is allowed only when the processor is in Kernel mode.
User Address space Accesses: Access to the User address space is always allowed.
Warm Reset: The contents of the Status register are unchanged by warm reset, except the following bits:
BEV and SR bits are set to 1.
Kuo/IEo←-Kup/IEp←-KUc/IEc←-0/0.
When an exception is recognized, both the KU and IE bits are "pushed" deeper into the stack with KUc and IEc set to zero (i.e., KUo/IEo←-KUp/IEp←-KUc/IEc←-0).
When a Return From Exception (RFE) instruction is executed, the values are "popped" off the stack with KUc/IEc being set to their previous values (i.e., KUc/IEc←-KUp/IEp←-KUo/IE0).
The Cause register is a read/write register. The Cause register's contents describe the cause of the most recent exception. A 5-bit exception code (ExcCode) indicates the cause as listed in the table below. The remaining fields contain detailed information specific to certain exceptions. All bits in the register with the exception of the IP <1:0> bits are read only. IP <1:0> bits are used for software interrupts. The format of the register is shown in FIG. 21.

| Exception Code Value | Mnemonic | Description |
| --- | --- | --- |
| 0 | Int | Interrupt |
| 1 | Mod | TLB modification exception |
| 2 | TLBL | TLB exception (load or instruction fetch) |
| 3 | TLBS | TLB exception (store) |
| 4 | AdEL | Address error exception (load or instruction fetch) |
| 5 | AdES | Address error exception (store) |
| 6 | Bus | Bus error exception |
| 7 | — | Reserved |
| 8 | Sys | Syscall exception |
| 9 | Bp | Breakpoint exception |
| 10 | RI | Reserved instruction exception |
| 11 | CpU | Coprocessor Unusable exception |
| 12 | Ov | Arithmetic overflow exception |
| 13 | Tr | Trap exception |
| 14 | — | Reserved |
| 15 | FPE | Floating-point exception |
| 16–31 | — | Reserved |

The Exception Program Counter (EPC) is a read-write register that contains the address where processing resumes after an exception has been serviced. For synchronous exceptions, the EPC register contains either:

the virtual address of the instruction that was the direct cause of the exception, or the virtual address of the immediately preceding branch or jump instruction (when the instruction is in a branch delay slot, and the Branch Delay bit in the Cause register is set).

FIG. 22 shows the format of the EPC register.

The Processor Revision Identifier (PRId) is a 32-bit, read-only register that contains information identifying the implementation and revision level of the CPU and CP0.

FIG. 23 shows the format of the PRId register.

The low order byte (bits <7:0>) of the PRId register is interpreted as a coprocessor unit revision number, and the secobd byte (bits <15:8>) is interpreted as a compressor unit implementation number. The SCobra implementation number is X. The contents of the high-order halfword of the register are reserved.

The revision number is a value of the form y.x, where y is a major revision number in bits <7:4> and x is a minor revision number in bits <3:0>.

The revision number can distinguish some chip revisions. However, LSI does not guarantee that changes to this core will necessarily be reflected in the PRId register, or that changes to the revision number necessarily reflect real core changes. For this reason these values are not listed and software should not rely on the revision number in the PRId register to characterize the core.

The Configuration and Cache Control (CCC) register allows software to configure various pieces of the SCobra design (i.e., BIU, TLB, Cache Controllers). FIG. 24 shows the format of the CCC register.

The Load Linked Address (LLAddr) register is a read/write register that contains the physical address read by the most recent Load Linked instruction. This register is used only for diagnostic purposes, and serves no function during normal operation. FIG. 25 shows the format of the LLAddr register.

Note: This register is physically located in the LSU, CPO must send read/write signals to the LSU when the value is to be read/written.

The Breakpoint Program Counter (BPC) register is a read/write register that software uses to specify a program counter breakpoint. FIG. 26 shows the format of the 32-bit BPC register.

This register is used in conjunction with the Breakpoint PC Mask register listed below.

The Breakpoint Data Address (BDA) register is a read/write register that software uses to specify a virtual data address breakpoint. FIG. 27 shows the format of the 32-bit BDA register.

This register is used in conjunction with the Breakpoint Data Address Mask register listed below.

The Breakpoint Program Counter Mask (BPCM) register is a read/write register that masks bits in the BPC register. A one in any bit in the BPCM register indicates the SCobra compares the corresponding bit in the BPC register for program counter (debug) exceptions. Values of zero in the mask indicate that SCobra does not check the corresponding bits in the BPC register. FIG. 28 shows the format of the 32-bit BPCM register.

The Breakpoint Data Address Mask (BDAM) register is a read/write register that masks bits in the BDA register. A one in any bit in the BDAM register indicates that SCobra compares the corresponding bit in the BDA register for data address (debug) exceptions. Values of zero in the mask indicate that SCobra does not check the corresponding bits in the BDA register. FIG. 29 shows the format of the 32-bit BDAM register.

The Rotate Register is utilized by new SCobra instruction set extensions. Select and rotate right (SELSR) and select and rotate left (SELSL) use this 5-bit value as the shift count. This is useful for data alignment operations in graphics, and in bit-field selection routines for data transmission and compression applications. FIG. 30 shows the format of the Rotate register.

Note: even though this register resides within CP0, user-mode access will always be granted regardless of the value contained in Status [Cu0].

The Circular Mask (CMask) Register is utilized by new SCobra instruction set extensions. The Load/Store word/halfword/byte with update circular instructions store a value into the destination register, and update the base address register with the addition of base+offset, modified according to this 5-bit value. This feature is important in DSP and other applications that use circular buffers. FIG. 31 shows the format of the Cmask register.

Note: even though this register resides within CP0, user-mode access will always be granted regardless of the value contained in Status [Cu0].

The Error Exception Program Counter (Error EPC) register is similar to the EPC. It is used to store the PC on cold reset, warm reset, and NMI exceptions. The read/write Error EPC register contains the virtual address at which instruction processing can resume after servicing the interrupt. The address may be either:

the virtual address of the first instruction terminated by the exception, or the virtual address of the immediately preceding branch or jump instruction when the terminated instruction is in a branch delay slot.

There is no branch delay slot indication for the Error EPC register. FIG. 32 shows the format of the Error EPC register.

EXCEPTION OPERATION—To handle an exception—the processor saves the current operating state, enters Kernel mode, disables interrupts, and forces execution of a handler at a fixed address. To resume normal operation, the operating state must be restored and interrupts enabled.

When an exception occurs, the EPC register is loaded with the restart location at which execution can resume after servicing the exception. The EPC register contains the address of the instruction associated with the exception, or, if the instruction was executing in a branch delay slot, the EPC register contains the address of the branch instruction immediately preceding.

R4000 Mode Operation: (default after cold reset)

The SCobra processor uses the following mechanisms for saving and restoring the operating mode and interrupt status:

A single interrupt enable bit (IE) located in the Status register.

A base operating mode (Use, Kernel) located in field KSU of the Status register.

An exception level (normal, exception) located in the EXL field of the Status register.

An error level (normal, error) located in the ERL field of the Status register.

Interrupts are enabled by setting the IE bit to 1 and both levels (EXL, ERL) to normal. The current processor operating mode is defined as follows:

| Current Mode | Status <KSU> | Status <EXL> | Status <ERL> |
|---|---|---|---|
| User | 10 | 0 | 0 |
| Kernel | 00 | 0 | 0 |
| Kernel | xx | 1 | 0 |
| Kernel | xx | 0 | 1 |

Exceptions set the exception level to exception (EXL=1). The exception handler typically resets to normal (EXL=0) after saving the appropriate state, and then sets it back to exception while restoring that state restarting. Returning from an exception (ERET instruction) resets the exception level to normal.

R3000 Mode Operation: This mode of operation is much simpler. The current processor operating state is always defined by the KUc bit (0→ Kernel, 1→ User). The basic mechanism for saving and restoring the operating state of the processor is the Kernel/User (KU) and Interrupt Enable (IE) stack located in the bottom 6 bits of the Status register.

When responding to an exception, the current mode bits (KUc/IEc) are saved into the previous mode bits (KUp/IEp). The previous mode bits are saved into the old mode bits (KUo/EIo). The current mode bits (KUc/IEc) are both cleared to zero.

After exception processing has completed, the saved state is restored through the use of the RFE instruction. This causes the previous mode bits to be copied back into the current mode bits and the old mode bits to be copied back into the previous mode bits. The old mode bits are left unchanged.

FIG. 33 depicts the CP0 exception pipeline. As exceptions are reported to CP0, they are checked for masking conditions. If none exist, the exception is added to the exception vector being piped with the offending instruction. The Program Counter (PC) value is needed for loading into the EPC register when the exception is presented (CR-cycle).

Instruction Set Summary—Following is an overview of the MIPS R-series instructions and instruction set extensions supported in this processor.

Instruction Set Formats—Every R-Series instruction consists of a single word 32(bits) aligned on a word boundary. As shown in FIG. 34, there are three instruction formats: I-type (immediate), J-type (jump), and R-type (register). This restricted format approach simplifies instruction decoding. More complicated (and less frequently used) operations and addressing modes can be synthesized by the compiler and assembler.

SYSTEM CONTROL COPROCESSOR (CP0) INSTRUCTIONS—Coprocessor 0 instructions perform operations on the system control coprocessor (CP0) registers to manipulate the memory management and exception-handling facilities of the processor. The following table summarizes the CP0 instructions.

| Instruction | Format and Description |
|---|---|
| CP0 INSTRUCTION SUMMARY | |
| Move to CP0 | MTCO rt, rd<br>Load contents of CPU register rt into CP0 register rd. |
| Move From CP0 | MFCO rt, rd |

-continued

| Instruction | Format and Description |
| --- | --- |
| | Load contents of CPO register rd into CPU register rt. |
| Read Indexed TLB Entry | TLBR<br>Load EntryHi and EntryLo with the TLB entry pointed to by the Index register. |
| Write Indexed TLB Entry | TLBWI<br>Load TLB entry pointed to by the Index register with the contents of the EntryHi and EntryLo registers. |
| Write Random TLB Entry | TLBWR<br>Load TLB entry pointed to the Random register with the contents of the EntryHi and EntryLo registers. |
| Probe TLB for Matching | TLBP<br>Load the Index register with the address of the TLB entry whose contents match the EntryHi and EntryLo registers. If no TLB entry matches, set the high-order bit of the Index register. |
| Exception Return | ERET<br>Load the PC from ErrorEPC(SR2=1:Error Exception) or EPC(SR2=0:Exception) and clear ERL bit (SR2=1) or EXL bit (SR2=0) in the Status Register. SR2 is Status register bit[2]. |
| CPO INSTRUCTION CW4010 EXTENSIONS | |
| Instruction | Format and Description |
| Waiti | Wait for Interrupt<br>Stops execution of instruction and places the processor into a power save condition until a hardware interrupt, NMI, or reset is received. |

There has been described a preferred embodiment of exception processing in a superscalar RISC processing system. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A method of handling exceptions in a microprocessor system having a core central processing unit (CPU) and a coprocessor for system control comprising the steps of:
    a) suspending a normal sequence of instruction by said CPU,
    b) loading an exception program counter with a restart location for use after the exception is serviced,
    c) saving the context of the current operating state of said CPU, and
    d) enabling said coprocessor to service the interrupt by loading a status register with operating mode and interrupt enabling bits.

2. The method as defined by claim 1 wherein said status register is formattable for compatibility with a plurality of instruction sets.

3. The method as defined by claim 2 wherein said coprocessor includes a configuration and cache control register, an instruction set being designated by setting at least one bit in said configuration and cache control register.

4. The method as defined by claim 3 and including the steps of:
    e) restoring the operating state of said CPU after exception processing.

5. The method as defined by claim 4 and further including:
    f) reestablishing user mode after exception processing.

6. The method as defined by claim 1 and including the step of:
    e) restoring the operating state of said CPU after exception processing.

7. The method as defined by claim 6 and further including the step of:
    g) reestablishing user mode after exception processing.

8. A microprocessor system comprising:
    a core central processing unit (CPU) for instruction execution, and
    a coprocessor interconnected with said core CPU for exception processing, said coprocessor including a plurality of exception handling registers including an exception program counter having a restart location stored therein for use after an exception is serviced, and a status register having operating mode identification and interrupt enabling bits.

9. The microprocessor system is defined by claim 8 wherein such status register defines a user mode and a supervisory (kernel) mode, said status register being formattable for compatibility with a plurality of instruction sets.

10. The microprocessor system as defined by claim 9 wherein said plurality of exception handling registers includes a configuration and cache control register, one of a plurality of instruction sets being designated by setting at least one bit in said configuration in cache control register.

11. The microprocessor system as defined by claim 10 and including registers to save the operating state of said CPU prior to interrupt enable, and including means to restore the operating state of said CPU after exception processing is completed.

12. The microprocessor system as defined by claim 11 wherein after exception processing is completed user mode is reestablished.

13. The microprocessor system as defined by claim 12 wherein said status register includes an interrupt enable bit (IE), base operating mode (user, kernel) bits (KSU), and exception level (normal, exception) bit (EXL), and an error level (normal, error) bit (ERL).

14. The microprocessor system as defined by claim 8 and including registers to save the operating state of said CPU prior to interrupt enable, and including means to restore the operating state of said CPU after exception processing is completed.

15. The microprocessor system as defined by claim 14 wherein after exception processing is completed user mode is reestablished.

16. The microprocessor system as defined by claim 15 wherein said status register includes an interrupt enable bit (IE), base operating mode (user, kernel) bits (KSU), an exception level (normal, exception) bit (EXL), and an error level (normal, error) bit (ERL).

* * * * *